United States Patent

[11] 3,585,607

[72] Inventors Hermanes Johannus Maria De Haan; Maarten Jan Vliegenthart, both of Emmasingel, Eindhoven, Netherlands

[21] Appl. No. 799,395
[22] Filed Feb. 14, 1969
[45] Patented June 15, 1971
[73] Assignee U. S. Philips Corporation New York, N.Y.
[32] Priority Feb. 19, 1968
[33] Netherlands
[31] 6802366

[54] MEMORY WITH REDUNDANCY
3 Claims, 2 Drawing Figs.

[52] U.S. Cl. 340/173, 340/172.5
[51] Int. Cl. G11c 15/00
[50] Field of Search 340/173, 166; 307/88

[56] References Cited
UNITED STATES PATENTS
3,331,061 7/1967 Marcus 340/173
3,402,398 9/1968 Koerner 340/173

*Primary Examiner*—Terrell W. Fears
*Attorney*—Frank R. Trifari

ABSTRACT: Word-organized memory having a plurality of group-organized words and a plurality of redundant words for each group for substituting defective words in that group and being provided with selection members for selecting, inter alia, words groups and the redundant words substituting the defective words and including an indicator address memory which for each word group comprises the address parts of the defective words in the group and at least comprises the address data of the redundant words substituting the defective words of that group due to the location of said address parts in a word of the indicator address memory, and including means by which the address of the indicator address memory associated with the group upon selection of this group can be selected simultaneously. The selection of a redundant word substituting a defective word is thus simpler and quicker. (FIG. 2).

INVENTORS
HERMANES J.M. DE HAAN
MAARTEN J. VLIEGENTHART
BY
AGENT

INVENTORS
HERMANES J.M. DE HAAN
MAARTEN J. VLIEGENTHART
BY
Frank R. Trifari
AGENT

MEMORY WITH REDUNDANCY

The invention relates to a word organized memory comprising a plurality of group-organized words and a plurality of redundant words, a plurality of memory elements being reserved for each word and for each redundant word, and including first selection members for selecting word groups, second selection members for selecting words in a word group and third selection members for selecting a redundant word substituting a defective word instead of selecting this defective word, and including an indicator address memory in which address data of the defective words and of the redundant words substituting the defective words are laid down, and an address comparator for controlling the second selection members or, in case of a defective word, for controlling the third selection members.

Such word-organized memories with redundant words are known. The redundant words are provided to be able to substitute defective words in the memory, for example, caused by defective or poorly functioning memory elements. A redundant word itself may also be defective which then cannot of course be used for substitution. This possibility of substituting a defective word is important because otherwise a memory or a part thereof, for example, a memory matrix would be altogether unusable. In the known device the addresses of the redundant words and the addresses of the defective words of the memory are stored in an indication address memory. When a certain word must be selected, it is first checked in a comparator whether the address of the word to be selected occurs in the said indicator address memory. If not, the word, which is then good, is directly selected from the memory. In the affirmative, that word is defective and the said indicator address memory provides the address of the redundant word substituting the defective word in the memory, which word is then selected. The method described above requires a complicated indicator address memory, a so-called "content addressed memory", because the entire word addresses of the defective words and the entire word addresses of the redundant words substituting the defective words are laid down therein. In practice, this indicator address memory is also a very expensive memory, because it must be very fast acting to prevent the selection of a redundant word for substitution of a defective word from taking too much time, due to the necessity of comparing the entire addresses of the words to be selected with all entire addresses of the words stored in the indicator address memory. An object of the invention is to adapt a word-organized memory as mentioned above so as to meet the said drawbacks. To this end the word-organized memory according to the invention is characterized in that a word group comprises both words and redundant words, that the indicator address memory comprises per word group the address parts of the defective words in the group and at least comprises the address data of the redundant words of that group substituting the defective words due to the location of said address parts in a word of the indicator address memory, that means are provided by which the address of the indicator address memory associated with a group upon selection of this group can simultaneously be selected, the address comparator device being adapted for comparing the address parts by which at least the location of a word to be selected is determined in a group with the selected above-mentioned address parts for that group from the indicator address memory. The invention is based on the recognition of the fact that the selection is simpler and quicker due to the incorporation in a group of a plurality of redundant words specially intended for that group and due to storing in the indicator address memory for each group the partial addresses of the defective words in that group and due to determining the address data of the redundant words substituting the defective words in that group. A word group and the word intended therefor in the indicator address memory may be selected simultaneously in a simple manner. A large number of elements in the indicator address memory, which in addition would have to be fast acting is economized because the group address parts of a word are not stored therein. For this simultaneous selection the selection members of the indicator address memory and the normal memory may be the same by interconnecting the normal memory and the indicator address memory, which thus also means an economy in the selection device. The address comparator is also simple of structure, because only partial addresses of the words in a group must be compared with the address data of the redundant words for that group. The indicator address memory may be a permanent "read-only" memory, but it may alternatively be a memory which can electrically be written on and has not destructive readout properties, being incorporated, for example, in the normal memory.

The memory according to the invention affords the further advantage that it is possible for the reading wires of the indicator address memory to be interconnected to those of the normal memory for this organization of groups comprising to this end for each group in the indicator address memory addresses of defective words and redundant words substituting the defective words. The reading amplifiers and registers for the address indicator memory and the normal memory are then used in common which again has a cost-saving effect.

If a memory can comprise, for example, 32,768 words, 15 bits are required to be able to address these respective words. If groups of 64 words each requiring 6 bits are chosen, the words have 9 bits in common for each group. Furthermore each group comprises a number of redundant words, for example, four which in this Example have not been included in the said addressing. A word of the indicator address memory is added to each word group. Thus in this Example $2^9=512$ words. Each word of the indicator memory comprises the addresses of the poorly functioning (defective) words from the corresponding word group (thus in this case 6 bits long for each address) including the substitution addresses of the corresponding redundant words in that group (thus in this case 4=2→2 bits long). Thus such a word in the indicator address memory is in the present case $4\times(6+2)=32$ bits long. During the selection with the aid of the first selection members, a word group is selected with the aid of the first 9 bits. At the same time the corresponding word in the indicator address memory is selected and read out. The final 6 bits of the address register are now compared with the addresses in the word of the indicator address memory. If two address parts of 6 bits correspond to each other, the corresponding address of the redundant word substituting the defective word (thus in this case 2 bits) instead of the 6 bits of the address register is used for the selection of a word in the relevant word groups. Thus the redundant word is selected by the third selection members. It will be evident that the location of a partial address which indicates the location of a defective word in a word group comprises in the word of the indicator address memory already sufficient data about the corresponding address of the redundant word, namely due to the sequence of the occurring defective and redundant words in the group. The above-mentioned word of the indicator address memory thus need not comprise the addresses of the redundant words in the form of separate bit locations (in this Example 2). The addresses of the redundant words are already given implicity in the word of the indicator address memory. In this memory according to the invention there is of course also the possibility to add a number of additional matrices which may be used for substituting those matrices which have too many defective words.

An advantage of the memory according to the invention, is that it is only necessary to test when the entire memory is ready. This is in contrast with those memories in which the matrices must first be checked for errors prior to assembly in order to be able to take steps to prevent defective words, for example, by repairing a memory element. This test which is carried out only once saves much test cost and has the advantage that the occurrence of defective words in the wiring of the matrix and the stack of matrices is discovered at the same time and can be substituted by a relevant addressing in the indicator address memory. It is even feasible that an entire memory and the addressing of the indicator address memory relative to the defective words are fested entirely automatically. The latter could be effected again and again even after use of the memory. In this case indicator address memory must be a destructive memory which can be written electrically in case of a readressing and it must be a not destructive readout memory in case of ordinary use. In order that the invention may be readily carried into effect, it will now be described in detail by way of example with reference to the accompanying diagrammatic drawings, in which:

Figure 1:
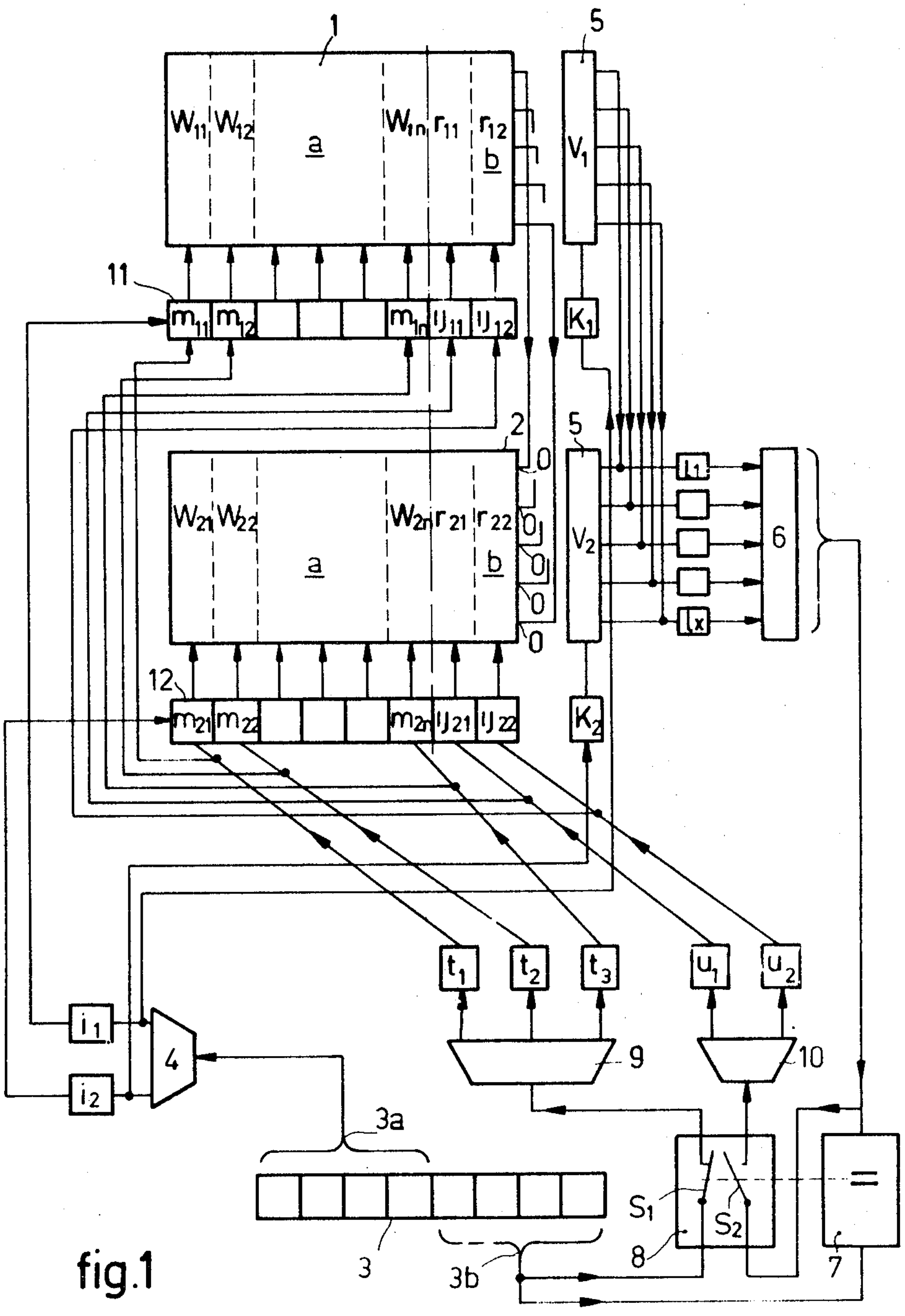
FIG. 1 shows one embodiment of a word-organized memory according to the invention.

In FIG. 1 two matrices as word groups 1 and 2 of a word-organized memory are shown as Examples. The matrices have a part *a* reserved for words $W_{11}$, $W_{12}$.....$W_{1n}$ and $W_{21}$, $W_{22}$..... $W_{2n}$, respectively, and have a part *b* reserved for redundant words $r_{11}$, $r_{12}$ and $r_{21}$, $r_{22}$, respectively. An address register in which the address appears of a word to be selected is indicated by 3. An address register part 3*a* of the register 3 serves to store a word address part which indicates in which word group the word to be selected can be found. A word address register part 3*b* serves to store the word address part which indicates on which location in the relevant word group the word to be selected can be found. The register part 3*a* is connected to a decoder 4. Dependent on a word group address part of the word address provided in the register part 3*a*, one driver $i_1$ or $i_2$ is energized. An entire word group 1 or 2 is then preselected by selectors 11 and 12, respectively.

An indicator address memory is indicated by 5. This memory 5 has a word $V_1$, $V_2$,..... available for each word group 1, 2...... Simultaneously with the word group selection one driver $k_1$, $k_2$ is energized from the decoder 4. As a result the address contents of the indicator memory 5, namely for the relevant group 1 or 2 and consequently the word $V_1$ or $V_2$ is stored through amplifiers $l_1$......$l_x$ in a register 6. A word $V_1$, $V_2$, for example, $V_2$ only contains that word address part of the defective words of the relevant word groups 2 which indicates the location of these defective words in that group. This word $V_2$ may further contain the addresses of the redundant words $r_2$, $r_{22}$ substituting the defective words in that group 2.

The location of a word address part of a defective word in the word $V_1$ or $V_2$ is, however, already a sufficient datum as an address of a redundant word substituting this defective word. A word, for example, $V_2$ is compared upon selection of word group 2 in an address comparator device 7 with the word address part indicating the location of the word in the group 2 and being present at that moment in the word address register part 3*b* of the register 3.

A switching device 8 including switches $S_1$ and $S_2$ given as Examples in this description is controlled from the address comparator 7. When a word address part from the register part 3*b* does not correspond to a defective word address part occurring in the word $V_2$, the switching device 8 remains in the position shown. Switch $S_1$ is closed and the word address part from register part 3*b* comes in a decoder 9. From decoder 9 one of the drivers $t_1$, $t_2$......$t_m$, in this Example, for example, $t_2$ is energized. Dependent on the already preselected group (in this Example the selector 12 for group) a selection element (for example, a magnet core or a transistor) $m_{11}$, $m_{12}m$ $1n$ and $m_{21}$ and $m_{22}$,...... . $m_{2m}$ (thus in this Example $m_{22}$) is now entirely energized in known manner in one of the selectors 11 or 12. The word $W_{22}$ is then entirely selected and may be read out and/or written in at the outputs Q of the memory.

If a word address part from the register part 3*b* corresponds to a defective word address part occurring in the word $V_2$ in the above-mentioned Example, the switching device 8 controlled by the address comparator 7 is reversed and closes the switch $S_2$. The address of the redundant word substituting the defective word, which thus directly or indirectly originates from the word $V_2$ due to the location of the word address part of the defective word in the word $V_2$, now appears in a decoder 10. The decoder 10 energizes a driver $u_1$ or $u_2$. Relevant selection elements $y_{11}$, $y_{12}$ and $y_{21}$, $y_{22}$, respectively, of selectors 11 and 12, respectively, (thus in this Example $y_{21}$ or $Y_{22}$) is energized. As a result the redundant word $r_{21}$ or $r_{22}$ substituting a defective word in the group 2 is entirely selected. This redundant word $r_{21}$ or $r_{22}$ is then read out and/or written in instead of the defective word through the said outputs 0 of the memory.

Figure 2:
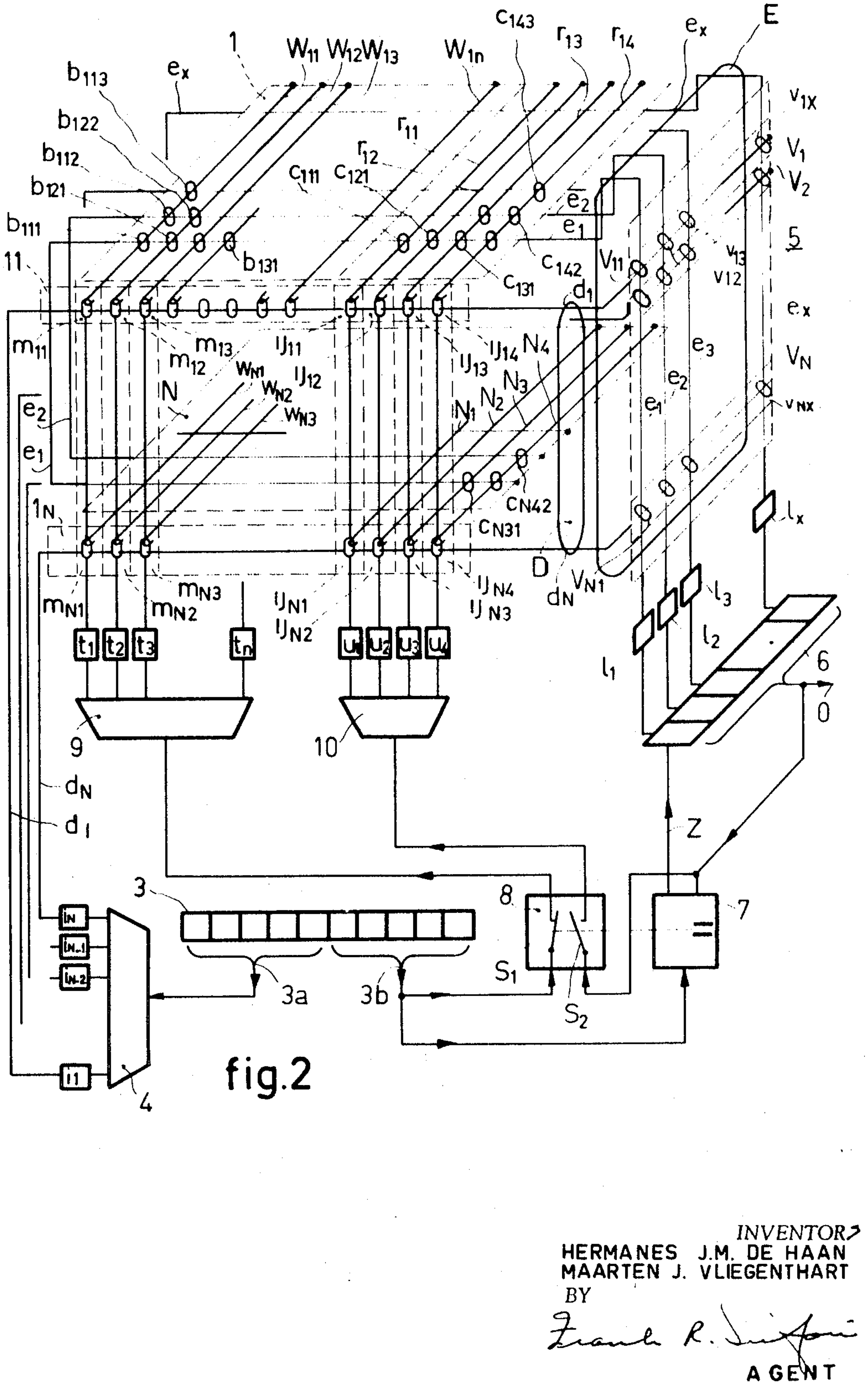
FIG. 2 shows a slightly modified embodiment of a word-organized memory according to the invention.

In FIG. 2 it has been attempted to show a more or less three-dimensional view of a memory according to the invention.

The parts corresponding to those in FIG. 1 are indicated by the same reference numerals. Matrices which form word groups 1......N are indicated by 1.....N.

The words of the memory are indicated by $W_{11}$, $W_{12}$,.... $W_{1n}$ for group 1 and by $W_{N1}$ $W_{N2}$ $W_{N3}$ .... for word group N. The separate bits of a word which in this case are stored for example in memory rings are indicated by reference numerals $b_{111}$, $b_{112}$, $b_{113}$... for the word $W_{11}$; $b_{121}$, $b_{122}$.... for the word $W_{12}$, etc. The redundant words are indicated by $r_{11}$, $r_{12}$, $r_{13}$, $r_{14}$ for matrix 1......and $r_{N1}$ $r_{N2}$ $r_{N3}$ $r_{N4}$ for matrix N. The separate bits of a redundant word are stored in, for example, memory elements $c_{111}$, $c_{112}$,.....for the redundant word $r_{11}$; $c_{121}$....for the redundant word $r_{12}$; $c_{N31}$ for the redundant word $r_{N3}$, etc.

The words in the indicator address memory 5 are indicated by $V_1$, $V_2$.....$V_N$ while the separate bits are represented by $v_{11}$, $v_{12}$.....$v_{1x}$ for word $V_1$ ....,$v_{N21}$,....$V_{Nx}$ for word $V_N$. The selection elements $k_1$, $k_2$..... shown in FIG. 1 are absent in this case because an interconnection D is provided between the memory and the indicator address memory 5. The selection wires $d_1$....$d_N$ continue into the indicator address memory 5.

The selectors 11, ....1N select both a group 1, ....N and a word $V_1$,.....$V_N$ of the indicator address memory 5. Furthermore, the reading wires $e_1$, $e_2$.....$e_x$ of the memory are connected through an interconnection E to the reading wires of the indicator address memory 5. If the number of bits for each memory word is equal to the number of bits for each indicator address memory word (in this Example $x$) all amplifiers $l_1$,.....$l_x$ and the register 6 for both kinds of words may be used in common. If the number of bits for these words is not equal, all amplifiers or part of the amplifiers $l_1$.....$l_x$ and the entire register 6 or part thereof may still be used in common.

The operation of the memory of FIG. 2 is largely indentical to the operation of the memory of FIG. 1.

The word address part of a word address in the register part 3*a* serves for the selection of a word group 1, ....N, in this case N, through the decoder 4 and one of the drivers $i_1$,.....$i_N$ in this case, for example, $i_N$. The selection wire $d_N$ conveys, for example, a current ½I by which the selection elements $m_{N1}$, $m_{N2}$....$m_{Nn}$ and $y_{N1}$, $y_{N2}$, $y_{N3}$ and $y_{N4}$ of the selector 1N are pre-energized. The same current ½I flows through the interconnection D to the relevant word location $V_N$ of the indicator address memory 5. The bit elements $v_{N1}$, $v_{N2}$....$v_{Nx}$ are then entirely energized and hence are read out through the reading wires $e_1$.....$e$ to the amplifiers $l_1$.....$l_x$. The word $V_N$ is then in the register 6.

This word is compared in the address comparator 7 with the word address part indicating the location of the word, for example, $W_{N3}$ in the group N which word address part is present at the moment in the word address register part 3*b* of the register 3. If the word address part of the word $w_{N3}$ to be selected from the register part 3*b* does not correspond to a defective word address part occurring in the word $V_N$ the switching device 8 remains in the position shown. Switch $S_1$ is closed and the word address part in register part 3*b* of the word $W_{N3}$ comes in the decoder 9. In this Example the selection element $m_{N3}$ is fed from the decoder 9 by a second current ½I. Only this selection element $m_{N3}$ is now entirely energized by a current I as the sum of the two mentioned currents ½I. This has the result that the word $W_{N3}$ can be read out and/or written in through the reading wires $e_1$, ....$e_x$, the amplifiers $l_1$ .... $l_x$ and the register 6 as an output Q of the memory. Meanwhile, due to a control from, for example, the comparator 7 indicated by line $z$ in the drawing, the word $V_N$ is erased from the register 6 at the instant when appears that the word address part of the word $W_{N3}$ to be selected from the register part 3*b* does not correspond to a defective word address part occurring in the word $V_N$.

If a word address part from the register part 3*b* corresponds to a defective word address part occurring in the word $V_N$ as mentioned in the above Example the switching device 8 controlled by the address comparator device 7 is reversed and close switch $S_2$. The address of the redundant word substituting the defective word, for example, $r_{N4}$ which thus originates directly or indirectly from the word $V_N$ due to the location of the word address part of the defective word in the word $V_N$ now appears in the decoder 10. The decoder 10 energizes the driver $u_4$. This driver supplies a current ½I and the selection element $y_{N4}$ of the selector 1N together with the previously mentioned selection current ½I from the driver $i_N$ is thus entirely energized. The redundant word $r_{N4}$ substituting the defective word, for example, $W_{Nj}$ is the entirely selected and can be read out and/or written in through the reading wires $e_1$ ....$e_x$, amplifiers $l_1$ ... $l_x$ and the register 6 which is meanwhile erased through line $Z$. It will be evident from the above description that a number of defective (poorly functioning) words per group which is equal to the number of redundant words per group are allowed in arbitrary locations in the group. In practice, this will mostly be sufficient to eliminate the defective words. If, however, a number of defective words are located together (so-called "bad spot") which is larger than redundant words in a group, the above-described memory may yet be entirely usable if the locations of the words of two or more groups are intermixed. Assuming a group to contain only the addresses of the even numbered words and another group containing the addresses of the odd numbered words located therebetween, it is possible to substitute in the manner according to the invention a "bad spot" which contains 8 words located side by side by 4 redundant words per group in the above-mentioned Example.

I claim:

1. A word-organized memory comprising a plurality of group-organized words and a plurality of redundant words, a plurality of memory elements being reserved for each word and for each redundant word, and including first selection members for selecting word groups, second selection members for selecting words in a word group and third selection members for selecting a redundant word substituting a defective word instead of selecting this defective word, and including an indicator address memory in which address data of the defective words and of the redundant words substituting the defective words are laid down, and an address comparator for controlling the second selection members or, in case of a defective word, for controlling the third selection members, characterized in that a word group comprises both words and redundant words, that the indicator address memory comprises per word group the address parts of the defective words in the group and at least comprises the address data of the redundant words of that group substituting the defective words due to the location of said address parts in a word of the indicator address memory, that means are provided by which the address of the indicator address memory associated with a group upon selection of this group and simultaneously be selected, the address comparator being adapted for comparing the address parts by which at least the location of a word to be selected is determined in a group with the selected above-mentioned address parts for that group from the indicator address memory.

2. A word-organized memory as claimed in claim 1, characterized in that the selection members for simultaneously selecting a group and the address of the indicator address memory associated with this group are the same to which end an interconnection is provided between the word-organized memory and the indicator address memory.

3. A word-organized memory as claimed in claim 1, characterized in that the reading wires of the word-organized memory are interconnected to those of the indicator address memory, the amplifiers and registers for both memories being used in common.